United States Patent [19]

Poy et al.

[11] Patent Number: 5,714,040

[45] Date of Patent: Feb. 3, 1998

[54] METHOD FOR RECOVERING FIBER FROM PRINTED WASTEPAPER

[75] Inventors: Russell Harris Poy, Destrehan; Christopher Mark Kulakowski, Violet, both of La.; Daniel Brian Mulligan, Woodinville, Wash.

[73] Assignee: Pellerin Milnor Corporation

[21] Appl. No.: 601,614

[22] Filed: Feb. 14, 1996

[51] Int. Cl.[6] .................................................. D21C 5/02
[52] U.S. Cl. ........................................ 162/4; 162/5; 162/55
[58] Field of Search .................................. 162/4, 5, 8, 55

[56] References Cited

U.S. PATENT DOCUMENTS

| | | | |
|---|---|---|---|
| 2,083,884 | 6/1937 | Wells | 92/20 |
| 3,635,789 | 1/1972 | Green, Jr. | 209/4 |
| 3,865,719 | 2/1975 | Holik et al. | 209/170 |
| 4,157,952 | 6/1979 | Krofta | 209/170 |
| 4,276,118 | 6/1981 | Quick | 162/5 |
| 4,332,638 | 6/1982 | Mauer et al. | 162/4 |
| 4,399,028 | 8/1983 | Kile et al. | 209/164 |
| 4,722,784 | 2/1988 | Barnscheidt | 209/164 |
| 4,820,379 | 4/1989 | Darlington | 162/5 |
| 4,865,690 | 9/1989 | Bernard et al. | 162/4 |
| 4,915,821 | 4/1990 | Lamort | 209/17 |
| 5,108,586 | 4/1992 | Iwashige et al. | 209/170 |
| 5,133,832 | 7/1992 | Gilkey | 162/4 |
| 5,141,598 | 8/1992 | Richman et al. | 162/5 |
| 5,176,822 | 1/1993 | Iwashige et al. | 209/168 |
| 5,200,034 | 4/1993 | Richmann et al. | 162/5 |
| 5,217,573 | 6/1993 | Tsai | 162/5 |
| 5,228,953 | 7/1993 | Bast et al. | 162/5 |
| 5,232,551 | 8/1993 | Hornfeck et al. | 162/5 |
| 5,234,543 | 8/1993 | Markham et al. | 162/5 |
| 5,234,545 | 8/1993 | Fabry et al. | 162/7 |
| 5,236,090 | 8/1993 | Britz et al. | 209/170 |
| 5,242,585 | 9/1993 | Krofta | 210/188 |
| 5,248,388 | 9/1993 | Richman et al. | 162/5 |
| 5,273,624 | 12/1993 | Chamberlain et al. | 162/4 |
| 5,282,997 | 2/1994 | Richmann et al. | 252/162 |
| 5,302,242 | 4/1994 | Richmann et al. | 162/5 |
| 5,308,448 | 5/1994 | Behler et al. | 162/7 |
| 5,310,459 | 5/1994 | Krofta | 162/4 |
| 5,358,605 | 10/1994 | Dorflinger et al. | 162/4 |
| 5,403,440 | 4/1995 | Daute et al. | 162/5 |
| 5,405,495 | 4/1995 | Cosper et al. | 162/5 |
| 5,413,675 | 5/1995 | Ikonomou et al. | 162/5 |
| 5,441,601 | 8/1995 | Cosper et al. | 162/5 |
| 5,520,780 | 5/1996 | Walker | 162/4 |

OTHER PUBLICATIONS

Article entitled "Laundering Recovered Paper: A Different Way"/*Progress in Paper Recycling*, by Daniel B. Mulligan, Feb. 1, 1995.

Article entitled "Laundry Recycling System Shows Promise for Hard–to–Handle Grades"/*Pulp & Paper*, by Kelly H. Ferguson, Feb. 1, 1995.

Brochure entitled "Ahlscreen Products—MODUScreen for Recycled Fiber Pulp", by A. Ahlstrom Corporation.

Brochure entitled "archimedai Heavy–duty Washing system" by Voss.

Brochure entitled "CLEANPAC 270—A unique cleaner concept exclusively used in deinking systems" by Celleco Hedemora.

Brochure covering "Continuous Batch Fiber Recovery system, manufactured by Pellerin Milnor Corporation".

Brochure covering "Ahlcleaner RB77 or RB87", available from Ahlstrom Kamyr, Inc.

Brochure providing an example of a "MODUScreen", available from Alhstrom Kamyr, Inc., (not enclosed).

*Primary Examiner*—Donald E. Czaja
*Assistant Examiner*—Dean T. Nguyen
*Attorney, Agent, or Firm*—Vaden, Eickenroht & Thompson

[57] ABSTRACT

There is disclosed a method for recovering fiber from printed wastepaper by loading the wastepaper and water into a continuous batch fiber recovery apparatus. The wastepaper and water are agitated within the apparatus to form a pulp fiber slurry while introducing a deinking/agglomerating composition at predetermined time intervals to cause the ink particles associated with the printed wastepaper to separate from the paper and agglomerate to form large ink particles. The agglomerated ink particles are then removed from the pulp fiber slurry using separation techniques.

35 Claims, No Drawings

METHOD FOR RECOVERING FIBER FROM PRINTED WASTEPAPER

BACKGROUND OF THE INVENTION

1. Field of the Invention

The present invention relates generally to a method for recovering fiber from printed wastepaper. Particularly, it relates to a method for removing and separating ink from pulped electrostatically printed wastepaper to recover a high quality fiber suitable for use in making writing and printing grade recycled paper.

2. Description of the Prior Art

An increasing amount of paper is being printed using electrostatic processes. Electrostatic printing (non-impact printing or xerographic printing) is primarily performed by photostatic duplicating machines (copying machines) and by "laser" printers to produce copies or computer drafted original documents, respectively.

Typically, the paper on which electrostatic printing is performed is of a high quality and provides a source for high quality recycled fiber. Thus, paper printed using electrostatic printing methods is an important source of recycled fiber, particularly for use in making printing and writing grade papers.

The increasing cost and decreasing availability of virgin fiber resources make it commercially and environmentally advantageous to recycle the higher grade paper used in electrostatic printing. Frequently, this paper is available mixed with other office waste, such as file folders, report covers, windowed envelopes, labels, and the associated "sticky" papers (i.e., note papers having an adhesive along a border for "sticking" the paper to other papers or documents), staples, rubber/elastic bands, and other contaminants. Generally, this supply of wastepaper is referred to as "mixed office waste". Although advantageous to recycle mixed office waste to recover the fiber, mixed office waste is under used as a source of fiber due to the high percentage of the difficult to deink electrostatically printed material it contains.

Various techniques for removing the printing inks are known. Conventional deinking processes were developed primarily for the high volume recycling of newspaper. However, the ink contained on the newsprint is highly soluble, and washed out with waste water produced during the pulping of the newspaper. The toners used in electrostatic printing usually include thermoplastic polymers which are inert to the saponification reactions normally used to remove water- or oil-based inks.

Unlike the highly soluble inks contained on newsprint and other impact printed materials, electrostatic inks are relatively insoluble, and difficult to remove from the wastepaper during paper recycling processes and from the pulp produced by the recycling process. Once the paper is reduced to a fiber slurry, dispersed ink particles carried along with the fiber in the slurry will in some degree be retained on the fiber during paper formation. Frequently, papers produced from such a fiber source will be gray in color or contain distinct ink spots, and will generally have a low brightness. To achieve high quality papers, the printing inks must be removed from the printed wastepaper and recycled pulp.

Known techniques for removing electrostatic inks from the wastepaper frequently involve directing a pulp slurry into a large tank or vat, treating the pulp with one or more chemical compound to enhance ink separation, and then using washing or flotation methods to separate the inks from the paper fibers. U.S. Pat. No. 5,403,440, Duate et al., Apr. 4, 1995; U.S. Pat. No. 5,310,459, Krofta, May 10, 1994; U.S. Pat. No. 5,234,545, Fabry et al., Aug. 10, 1993; U.S. Pat. No. 5,228,953, Bast et al., Jul. 20, 1993; and U.S. Pat. No. 3,635,789, Green, Jr., Jan. 18, 1972. Washing and flotation methods for removing inks from wastepaper pulp are not efficient, do not effectively remove filler, and often result in a high fiber loss.

U.S. Pat. No. 5,308,448, Behler et al., May 3, 1994, discloses a process for enhancing the flotation of fillers from the deinked wastepaper using surfactants containing sulfonate groups. U.S. Pat. No. 5,232,951, Hornfeck et al., Aug. 3, 1993, discloses a process for removing filler by adding an organic phosphoric acid ester to facilitate floating fillers to the surface of a fiber slurry. The processes, however, still require a large flotation vat and do not efficiently remove inks.

Alternative methods for deinking electrostatic printed papers have used mechanical means other than flotation and/or washing to remove the inks. U.S. Pat. No. 5,413,675, Ikonomou et al., May 9, 1995, discloses immersing sheets of wastepaper printed with electrostatic inks in a solvent bath to dissolve the ink binder. The ink particles are separated from the wastepaper using low frequency ultrasound and are separated from the solvent bath using magnetic stirrers or other means. Collecting chemicals have also been used to remove electrostatic inks. Collecting chemicals cause the ink particles to adhere to collectors, and the bound particles can then be removed using methods known in the art. U.S. Pat. No. 4,276,118, Quick, Jun. 30, 1981.

Chemical deinking and agglomeration processes for recycling wastepaper containing electrostatic printing are also known in the art. Agglomeration chemicals consisting of polymeric systems are employed to aid in the ink agglomeration process. In deinking paper through agglomeration, the wastepaper is repulped and deinked through chemical treatment to provide a slurry of pulp and ink agglomerates. The ink agglomerates are removed from the pulp through a variety of separation procedures.

U.S. Pat. No. 5,405,495, Cosper et al., Apr. 11, 1995 and U.S. Pat. No. 5,441,601, Cosper et al., Aug. 15, 1995 disclose repulping an aqueous slurry of xerographic paper, and adding an organic polymeric particulate and a substantially water insoluble organic ester to the pulped paper slurry to agglomerate the ink particles in the slurry. The compounds are added at different times to enhance deinking results. U.S. Pat. No. 4,820,379, Darlington, Apr. 11, 1989, discloses a method for removing ink from fiber by contacting a pulp of the fiber with an aqueous medium in the presence of a polymeric material having a specified glass transition temperature and a substituted polyethylene oxide to agglomerate the ink.

U.S. Pat. No. 5,234,543, Markham et al., Aug. 10, 1993, discloses a process for deinking printed paper by agglomeration and then further agglomeration or reagglomeration of remaining ink particles. Only large agglomerated ink particles are removed from the ink pulp medium upon its initial pass through a pressure screen and/or a centrifugal cleaner. Fine ink particles remain in the ink pulp stream, thereby necessitating that the ink pulp medium be recirculated to the pulping vessel with further application of deinking chemicals and steam to cause additional agglomeration of ink particles.

Other methods for deinking electrostatic printed wastepaper, as disclosed in U.S. Pat. No. 5,141,598, Richmann et al., Aug. 25, 1992; U.S. Pat. No. 5,200,034, Richmann et al., Apr. 6, 1993; U.S. Pat. No. 5,248,388, Richmann et al., Sep. 28, 1993; U.S. Pat. No. 5,282,997, Richmann et al., Feb. 4, 1994; and U.S. Pat. No. 5,302,242, Richmann et al., Apr. 12, 1994, utilize a composition which enhances the agglomeration of electrostatic ink particles. The methods require a long processing time of the wastepaper and/or pulp in the presence of the composition and the quantity of composition should be adjusted depending upon the type of wastepaper furnish recycled.

Many of the known deinking processes capable of deinking papers printed using electrostatic inks are complex and not entirely satisfactory in that often high concentrations of one or more expensive chemicals are necessary to obtain deinking, and adequate pulp cleanliness is not often achieved. The known methods frequently require that the pulped paper be recirculated or retreated in some way in order to remove enough ink to produce a pulp for use in making high quality grade papers. Moreover, multiple steps may be required for debris removal and actual ink removal.

Many of the systems for recycling wastepaper known in the art utilize single batch processing equipment. A batch or load of wastepaper is processed to completion before additional wastepaper is added to the tank or vat for pulping and deinking treatment. Frequently the pulping and deinking are done in separate apparatuses, however, treatment for each is still done on a single batch basis. Processing wastepaper in single batches requires that more time, energy, and water be used to recover the fiber from the waste than in a system that allows continual processing of wastepaper to pulp, deink, remove the inks, and recover the fiber.

Continuous batch washing machines which are typically used for the washing of textile goods may be used as a continuous batch fiber recovery system. A continuous batch fiber recovery system is generally defined as a system for continually processing a fiber source such as paper to produce a fiber slurry which may be recovered for subsequent uses. Continuous batch washing machines with some modification, have been disclosed for use in recycling various disposed goods, including paper, particularly, newspaper. U.S. Pat. No. 5,225,045, Watson, Jul. 6, 1993, discloses a continuous batch fiber recovery apparatus in which newsprint can be continuously processed to wash ink from the newsprint.

The reference does not, however, disclose a process for utilizing a continuous batch system to process papers printed with electrostatic inks. Known methods for processing wastepaper printed with electrostatic ink frequently require that the paper be batch processed in relatively large volumes of liquid to soak the paper in ink removing chemicals. There remains a need for a simple continuous batch method for recovering fiber from wastepaper printed with electrostatic inks having the level of ink removal and brightness required in the deinked pulp to produce high quality recycled papers, and wherein the addition of chemicals into the system is easily controlled during the process.

SUMMARY OF THE INVENTION

The present invention provides a method for recovering high quality fiber from wastepaper. Particularly, cellulose fiber is recovered from electrostatic printed wastepaper by removing ink from the paper as it is pulped. The ink is separated, agglomerated, and densified using a deinking/agglomeration and densifying composition (hereinafter "deinking/agglomerating composition"). These ink particles are then removed from the pulped printed wastepaper. The increased density of the ink particles eliminates fine ink particles and enables removing the densified, heavy, ink particles regardless of the size of the particle.

Most contaminants found in the wastepaper, except some of the inks and the "sticky" papers, such as self-sticking note papers, are removed using counterflow dilution washing. The term contaminants is used herein to refer generally to dirt, plastic, staples, paper clips, stickies, and other non-paper materials found in the wastepaper furnish. The ink particles removed from the wastepaper may also be referred to generally as contaminants. The term "stickies" will be used herein to refer to these and other papers having adhesives along a border of the paper so that it will adhere to papers and other items.

Known separation procedures are employed to remove any densified, agglomerated ink particles not removed during washing of the pulp. The high quality fiber recovered is suitable for use in making writing and printing grade recycled paper.

The method of the present invention is practiced in a continuous batch fiber recovery apparatus having perforated drums rotatable within end-to-end compartments, or chambers, as described herein. Continual processing of the wastepaper through the system provides an efficient means for recovering the fiber. Less energy and water will be used to recover the fiber than with other fiber-recovery systems. Additionally, a continuous batch system enables equilibrium in the chemical and other conditions within the apparatus to be established as the wastepaper is processed.

Approximately equal volumes of wastepaper are loaded into the first drum of the first compartment of the system. As each load of wastepaper is transferred from the first compartment, a new load of wastepaper replaces it so that a steady stream of wastepaper is continuously processed in the system.

The present method for recovering fiber from printed wastepaper using a continuous batch fiber recovery system comprises the steps of loading batches of printed wastepaper into the first drum of a first zone of the system. The drums of the first zone are rotated for predetermined, essentially equal intervals. At the end of each interval, a predetermined sequence of rotation is initiated so as to transfer the batch in the drum to a succeeding drum. At the same time, the batch in the last drum of the first zone is transferred to a first drum of a second zone.

A deinking/agglomerating composition is introduced into each drum of the first zone during each interval. Agitation due to the rotation of the drum promotes separation of the ink particles from the wastepaper so as to form a pulp fiber slurry. The amount of deinking/agglomerating composition added to each batch during each interval is essentially equal. The total amount of deinking/agglomerating composition added to each batch during its movement through the first zone is that which is predetermined to be necessary to separate ink particles from the wastepaper and to agglomerate/densify the separated ink particles.

The separated and agglomerated ink particles are removed by washing the pulp fiber slurry in the compartments in the second zone. The drums of the second zone are rotated for predetermined, essentially equal intervals. At the end of each interval, a predetermined sequence of rotation is initiated so as to transfer the batch in each drum to a succeeding drum, and the batch in the last drum is transferred out of the second zone.

The pulp fiber slurries which have been transferred into the first and succeeding drums of the second zone are washed within the second zone and the agglomerated ink particles are permitted to pass through perforations in the drums of the second zone for drainage from the system. As the pulp fiber slurries are washed, make-up water is added to the drums of the second zone. Cellulose fibers are recovered from the system as each batch is transferred from the last compartment out of the second zone.

In the preferred embodiment of the present invention, approximately 300% to 400% of the amount of the deinking/agglomerating composition introduced into each drum of the first zone during each interval is added to each drum of the first zone prior to loading batches of wastepaper successively into the first drum of the first zone. It is also preferred that the amount of deinking/agglomerating composition introduced into each drum of the first zone during each interval is approximately 2% to approximately 5% by weight basis of the total weight of fiber in the wastepaper.

In the preferred embodiment, a caustic is also introduced into the first zone of the continuous batch fiber recovery system. The pH in the compartments of the first zone is maintained at approximately 11.0. If the wastepaper contains a substantial amount of stickies, the water within the compartments of the first zone is maintained at a temperature not greater than approximately 160° F. If the wastepaper does not contain many stickies, higher water temperatures may be used in the first zone.

Additional deinking/agglomeration composition and other chemicals, as described herein, may be added in addition to that added at the predetermined time intervals if it becomes necessary to adjust the concentration of a particular chemical in a compartment.

The method may include rotating the drums of a third zone having a first drum to receive pulp fiber slurries from the last drum of the second zone. Each batch is transferred from the last compartment of the second zone into a first drum of a third zone. The drums of the third zone are rotated for predetermined essentially equal intervals, and at the end of each interval a predetermined sequence of rotation is initiated so as to transfer the batch in the first drum to a succeeding drum. Each batch is transferred out of the system from the last drum of the third zone.

The pulp fiber slurries transferred into the first and succeeding drums of the third zone will pass through perforations in the drums of the third zone for drainage from the system while make-up water is added to the drums of the third zone. Contaminants such as stickies will also exit with the cellulose fiber through the perforations in the drums of the third zone. The cellulose fiber is recovered from the system as each batch is transferred out of the system from the last drum of the third zone.

The temperature of the water in the drums of the third zone is maintained at approximately 100° F. The pH in the compartments of the third zone is maintained at approximately 7.0.

A two material path flow is established as gross contaminants are separated from the pulp, i.e., a contaminants flow and a slurry or "accepts" flow. Accepts refers to the stream of pulp or fiber particles which will be recovered for subsequent uses. The accept stream may contain stickies, which will be removed as described herein. It is preferred that the consistency of the accepts stream be approximately 0.5% to approximately 1% by weight of pulp and contaminants in order to facilitate removal of the stickies and other associated contaminants remaining in the accepts stream using techniques known to those skilled in the art.

DESCRIPTION OF THE PREFERRED EMBODIMENT

The present invention is a novel "continuous batch fiber recovery" method for use in recycling printed wastepaper. The method of the present invention pulps the paper and removes ink particles, particularly electrostatic printing inks, including laser and photographic reproduction inks, from the wastepaper. The printed wastepaper feedstock, or furnish, is processed/pulped in the continuous batch fiber recovery system and subjected to deinking/agglomeration chemicals under controlled conditions to recover high quality, clean cellulose fiber from the wastepaper. The fiber is suitable for use in making writing and printing grade paper. Although the method of the present invention may be carried out in a single compartment or single chamber apparatus, it is referred that a continuous batch fiber recovery apparatus of the type described herein is used.

Continuous batch washing machines which have been modified for use in recycling processes are commercially available, such as for example Model 76039 P4F, M, L, "Continuous Batch Fiber Recovery System", manufactured by Pellerin Milnor Corporation, Kenner, La., U.S.A. and available from Regenex, L.L.C., Kenner, La., U.S.A.

The continuous batch fiber recovery apparatuses preferred for use with the described invention will have a plurality of compartments. The compartments are arranged in a row, end-to-end, and each compartment contains a perforated drum for holding the goods within the compartment. The drums are perforated to allow water to be drained from the drums without allowing the goods in the drums to escape. Each drum has one or more ribs for agitating the goods in the drum.

The drums may be controlled to rotate at predetermined intervals. The drums may be rotated in a single direction (unidirectional) or back and forth (bidirectional or oscillating) to agitate the goods in each drum. However, greater agitation of the goods in the drums occurs when the drums are oscillated as compared to rotated in a single direction. The increased agitation also produces increased fiber-to-fiber contact, which further enhances the mechanical pulping effect on the wastepaper. The goods are transferred from one drum to the next by rotating the drums, preferably in a single direction. As a drum rotates, the goods enter a scoop on the drum that allows the goods to pass from one drum to the next, or to the outside of the apparatus when the drum is the last drum.

As will be more fully explained below, it is preferred that the continuous batch fiber recovery apparatus allows water and chemical compositions to be introduced to the compartments from below the bath liquor level in the compartments.

Continuous batch machines which transfer the wastepaper or other goods along the bottom of the apparatus without lifting the material may also be used to practice the method of the present invention. Such machines are known to those skilled in the art and may be referred to as "bottom-transfer" or "archimedia" washing systems. Such systems allow batches of material to be processed as they are pushed along inside the system by an acrchimedian screw.

The cellulose fiber recovered from the system may be processed through one or more centrifugal devices to remove contaminants from the cellulose fiber. The cellulose fiber recovered from the system may also be passed through one or more pressure screens to remove contaminants.

Any wastepaper source may be processed using the method of the present invention. The method will be described herein, however, by reference to using "mixed office waste" as the furnish. Mixed office waste may include all grades and types of wastepaper, including file folders, stiff papers, file dividers, windowed envelopes, and the like, as well as associated contaminants, such as staples, plastic, "stickies", paper clips, etc.

Mixed office waste may be obtained "loose", i.e., in bags or boxes, or baled. No mechanical preprocessing of the furnish, such as shredding or removing contaminants, is required prior to subjecting it to the fiber recovery method of the present invention. However, bags, bale strings or bale wires should be removed in order that the furnish can be evenly fed into the continuous batch fiber recovery apparatus by conveyor, sling, chute or other means known to those of ordinary skill in the art.

The following discussion is illustrative of a preferred embodiment of the present invention. Each step and phase of the method is discussed with reference to a single load of wastepaper as it passes through the apparatus. It is to be understood that the present method is performed continually within the apparatus such that as a load or batch of wastepaper and/or pulp is transferred from one drum to a subsequent drum, another load is transferred into the emptied drum.

In the preferred embodiment of the invention, the wastepaper is pulped and deinked in a first zone of drums. A batch of furnish is loaded into the first drum of the first compartment of the first zone. Water may be added to the compartment before, during, or after the furnish is loaded into the drum. It is preferred that hot water be added to the compartment. If the wastepaper contains a large amount of stickies, it is preferred that the water temperature does not exceed approximately 160° F. Maintaining the temperature at no greater than 160° F. prevents contaminants, such as the stickies, adhesives, and plastics in the mixed office waste from becoming too soft and sticky, and thereby making it difficult to remove them during washing or by separation techniques. If the wastepaper does not contain many stickies, higher water temperatures may be used.

The amount of furnish loaded into the drum will be dependent upon the size of the compartment and drum, and will be apparent to those skilled in the art. It is preferred that equal amounts of furnish be added to each drum.

The drums in the first zone are oscillated for predetermined intervals. It is preferred that all the drums in the first zone are oscillated for essentially equal intervals. At the end of each interval, a predetermined sequence of rotation of the drums in the first zone is initiated. The rotation transfers the batch of wastepaper in the drum to a succeeding drum in the first zone. The batch in the last drum of the first zone is transferred to the first drum of a second zone.

In the first compartment, the wastepaper begins to breakdown and be fiberized. The mechanical action of the ribs and the oscillating drum pulps the paper. As the paper breaks down, the cellulose fibers of the paper are freed. In approximately 5 to 8 minutes, the furnish is nearly completely reduced to a pulp slurry.

The breakdown or pulping of the wastepaper is enhanced due to the mechanical action of the ribs on the wastepaper. A caustic or alkaline compound, such as sodium hydroxide, is added to maintain a pH of approximately 11.0 in the compartments of the first zone. The alkaline condition causes the fibers of the paper to swell, thereby making the fibers more fragile and enhancing the pulping process.

The temperature of the paper/water mixture and the pH level are monitored in the first and all subsequent compartments in the system using means known to those in the art. If the temperature of the mixture increases or decreases, the temperature of the water added is adjusted accordingly to maintain the desired maximum temperature. The pH may also be adjusted by either adding caustic to increase the pH or adding more water to dilute/decrease the pH.

A deinking/agglomeration composition is also introduced into each compartment of the first zone. The deinking/ agglomerating composition separates or lifts the ink particles from the wastepaper. Once the ink particles are freed from the paper, they become hydrophobic and agglomerate to one another, thereby forming dense, spherical ink particles. A preferred deinking/agglomerating composition to be used in the described method is Betz DI225, available from Betz PaperChem, Jacksonville, Fla., U.S.A.

The amount of deinking/agglomerating composition used is calculated based upon the fiber and electrostatic ink/toner content of the furnish. Generally, it is estimated that mixed office waste furnish will contain approximately 20% fillers and inks, 5% contaminants, and 75% fiber. Therefore, approximately 1500 pounds of dry fiber will be contained in each ton of mixed office waste furnish.

The quantity of deinking/agglomeration composition needed to deink the wastepaper and agglomerate the inks removed from the paper typically ranges from approximately 2% to a maximum of about 5% by weight basis total weight of dry fiber and quantity of inks undergoing treatment. It is preferred that approximately 2% by weight basis total weight of dry fiber undergoing treatment be used. If the wastepaper contains little electrostatic ink, less than 2% by weight of the composition may be used. Sources of mixed office waste or other wastepaper containing a large quantity of papers printed with electrostatic inks may require that greater than approximately 5% by weight of the composition be used.

It is also preferred that approximately 300% to 400% of the amount of the deinking/agglomerating composition introduced into each drum of the first zone during each interval is added to each drum of the first zone prior to loading batches of wastepaper successively into the first drum. This initial super-dose of deinking/agglomeration composition establishes the composition level in each compartment that will be maintained throughout the time the system is processing wastepaper. Unless the method is interrupted, halted, or feedstock is changed, the super-dose composition amount will be maintained within each compartment. The composition amount added to each compartment during each interval will replace the small amount of the composition that is washed out of the compartments in the first zone as the batches are processed.

The deinking/agglomeration composition is added to the first and subsequent compartments in the first zone of the apparatus such that the composition is present in the compartments of the first zone and in contact with the furnish and/or pulp slurry for a period of time ranging from about 32 to 60 minutes. In a preferred embodiment, the composition will be in contact with the furnish and/or pulp for approximately 32 minutes.

It is preferred that the amount of composition needed to deink and agglomerate the inks from a particular amount of furnish is added in equal amounts to each compartment of the first zone during each of the predetermined intervals. For example, a typical embodiment of the continuous batch fiber recovery apparatus described above will have twenty-four compartments, and may yield twenty-five or more tons per day of recovered high quality cellulose fiber. In such a system, it is preferred that sixteen of the twenty-four compartments make up the first zone and are used for pulping and deinking the furnish and agglomerating the inks. Therefore, in this preferred embodiment, the furnish and/or pulp slurry will remain in each module for two minutes. Additional deinking/agglomeration composition and other chemicals, as described herein, may be added in addition to that added at the predetermined time intervals if it becomes necessary to adjust the concentration of a particular chemical in a compartment.

One-sixteenth of the amount of composition required for deinking and agglomerating the inks from each batch of furnish loaded into the first compartment will be introduced to each of the sixteen compartments. Thus, if 100 pounds of furnish is loaded into the first compartment of the first zone, it can be calculated that approximately 75 pounds of fiber will be contained in the furnish. Two percent by weight or 1.5 pounds of deinking/agglomeration composition will be used to treat the 100 pounds of furnish to remove and agglomerate electrostatic inks on the paper. One-sixteenth of this amount, or approximately 0.094 pounds of composition, will be added to each of the sixteen compartments.

Injecting a fraction of the total deinking/agglomeration composition into a number of compartments establishes equilibrium or "steady state" within the compartments of the first zone. The steady-state environment established is particularly advantageous with respect to deinking and agglomerating electrostatic inks contained on the wastepaper. The extended exposure to a relatively constant amount of the composition enhances overall ink separation and agglomeration. Therefore, complete removal of ink from the pulp and agglomeration of the inks into larger particles can be obtained. The larger, dense particles are easily separated from the pulp slurry, and a high quality recycled cellulose fiber is recovered.

As indicated above, the water, deinking/agglomerating composition, caustic, and other chemical compounds added to each compartment are injected into the module through one or more openings located in the bottom of the module. Injecting and thoroughly mixing the chemicals below the bath liquor level quickly and evenly distributes the compounds into the water in the compartment, thereby preventing "hot spots" of chemicals or water, which may deleteriously affect the quality of the recovered fibers. The chemical compounds are thoroughly mixed in the water before contacting the fibers. Water in the compartments during the pulping and deinking/agglomeration phase of the method is maintained at a homogeneous temperature. The avoidance of "hot spots" by the continuous agitation of materials in each compartment and introducing and mixing water and other compositions below the bath liquor level is an advantage of continuous batch fiber recovery apparatuses.

Complete pulping of the paper will be substantially accomplished in the first three or four compartments of the sixteen compartments of the first zone. Deinking or separating the ink particles from the paper will also take place primarily in the first three or four compartments as the furnish is fiberized to form a pulp slurry. However, some pulping and deinking will continue to occur throughout the first zone. Agglomeration of the separated ink particles to form larger, dense particles will occur continually in the drums of the first zone.

It is preferred that the wastepaper is pulped and the electrostatic inks removed and agglomerated in the presence of a low volume counter flow of water in the drums in the first zone. This counterflow will have some washing effect on the wastepaper and will remove some contaminants such as removed, densified ink particles. Contaminants such as small pieces of heavy materials (dirt, staples, etc.), soluble inks, some of the agglomerated inks, and small pieces of plastics will exit through the perforations in the drums. A counterflow of approximately 4 gallons per minute may be used.

Following treatment with the deinking/agglomeration composition, the pulp slurry is transferred from the last drum in the first zone to the first drum of a second zone of compartments in the system. In the second zone, the pulp slurry is washed to remove the agglomerated and densified ink particles. The pulp slurry is washed for approximately 8 minutes. In the twenty-four compartment apparatus described above, the second zone will comprise four compartments. The pulp slurry will be washed as it moves through the four compartments. The pulp slurry may be washed in a faster countercurrent flow than that circulating through the first sixteen compartments. For example, a countercurrent flow of approximately 130 gallons per minute may be used to wash the slurry.

As the slurry is washed, the pH is maintained at 11.0. The temperature in the compartments of the second zone will be reduced to approximately 120°–140° F. It is preferred that the temperature of the pulp slurry is reduced to prevent the polymers in the electrostatic inks and the adhesives in the stickies from becoming "gummy". During this washing phase, the agglomerated ink particles will be washed out of the pulp through perforations in the drums. The perforations may be of any dimension which will retain the fiber in the drum, but allow agglomerated inks and other small contaminants to exit as the pulp is washed. Approximately 0.031 inch perforations may be used in the drums.

After the pulp has been washed, gross contaminants may be separated from the accept stream in a third zone of the system. In a twenty-four compartment apparatus, it is preferred that the last four compartments make up the third zone for the gross contaminants separation phase. The pH in the compartments of the third zone is reduced to approximately 7.0 by water dilution of the pulp slurry entering the compartments. The temperature will be reduced and maintained at approximately 100° F.

The pulp fiber exits the last compartment of the third zone, which is also the last compartment of the apparatus, through drains in the bottom of each compartment. Gross contaminants, such as plastic, paper clips, rubber bands, etc., are retained in the drum. The drums within these compartments have perforations or other openings which are small enough to retain the contaminants but allow the fibers through. Pieces of stickies and agglomerated inks not washed out earlier will also exit with the pulp.

Once the accepts stream of pulp has exited the apparatus, it may be further processed to remove stickies, any ink particles remaining, and any smaller contaminants, bleached to whiten the fibers, or polished. Procedures for accomplishing these processes are known to those of ordinary skill in the art. In the preferred embodiment, the accept stream of the pulp fiber is processed through a centrifugal cleaner, such as a hydrocyclone. Examples of cleaners suitable for use include CleanPac 270, available from Celleco Hedemora, Lawrenceville, Ga., U.S.A.; Ahlcleaner RB77 or RB87, available from Ahlstrom Kamyr, Inc., Glens Falls, N.Y., U.S.A.

The consistency of the accept stream is adjusted, if necessary, for processing through the centrifugal cleaners. The consistency, or fiber to liquid ratio, of the pulp will be consistent with the operating parameters of the centrifugal cleaners used, and will be apparent to those skilled in the art. Ink particles which were not removed during the washing of the pulp fiber will be separated in the centrifugal cleaners. Because the deinking/agglomerating composition agglomerates and densifies the ink particles separated from the wastepaper, no fine ink particle stream is produced. Nearly all the remaining agglomerated inks are dense, heavy particles that are readily removed from the slurry using centrifugal or other known means.

The accepts are recovered from the dilute slurry exiting the centrifugal cleaners using screening or drying methods known to those skilled in the art. The dilute fiber slurry or dry fiber may be further processed using bleaching methods known to those in the art which will not darken the fiber. Reductive or oxidative bleaching methods may be used. Hydrosulfite bleaching using formandine sulfinic acid (FAS) has been proven effective in bleaching fiber previously exposed to alkaline conditions. Bleaching will further whiten the fiber and increase brightness. Following bleaching, the fiber may be conditioned with a neutralizer.

Prior to being routed through the centrifugal cleaners, the accept stream may be passed through a pressure screen to screen out any contaminants not removed during washing of the pulp in the second zone or during the separation phase in the third zone, particularly the stickies. Generally, stickies will exit the continuous batch fiber recovery apparatus in the accepts stream and must be removed from the pulp. An example of a pressure screen which may be used to remove the stickies is a MODUScreen, available from Ahlstrom Kamyr, Inc., Glen Falls, N.Y., U.S.A.

The present invention does not exclude the use of other solids/liquid separation techniques or the combination of such techniques, which are known to those in the art.

A twenty-four compartment system is preferred for practicing the present invention, however, an apparatus having fewer compartments may be used to practice the present invention. If an apparatus having fewer compartments is used, the furnish and/or pulp will remain in each compartment for a longer period of time in order for it to remain in contact with the deinking/agglomeration composition for the preferred 32 minutes, or longer. The furnish will be transferred to subsequent compartments of the apparatus at the appropriate predetermined time intervals, depending upon the number of compartments available. These intervals may easily be calculated.

While this invention has been described with respect to particular embodiments thereof, numerous other forms and modifications of this invention will be apparent to those skilled in the art. The appended claims and this invention generally should be construed to cover all such obvious forms and modifications which are within the true spirit and scope of the present invention.

What is claimed is:

1. A method for recovering cellulose fibers from printed wastepaper through the use of a continuous batch fiber recovery system having perforated drums rotatable within end-to-end compartments in which water is maintained at a level above the bottoms of the drums, and having a scoop of such construction as to transfer a batch from each drum to the next in response to a predetermined rotational sequence, comprising the steps of:

loading batches of the printed wastepaper successively into the first drum of a first zone of the system;

rotating the drums of the first zone for predetermined, essentially equal intervals and, at the end of each interval, initiating the predetermined sequence of rotation so as to transfer the batch therein to a succeeding drum, and from a last drum of the first zone to a first drum in a second zone;

introducing a deinking/agglomerating and densifying composition into each drum of the first zone during each interval, so that agitation due to rotation of the drum promotes separation of the ink particles from the wastepaper so as to form a pulp fiber slurry, and wherein the amount of deinking/agglomerating and densifying composition added to each batch during each interval is essentially equal and the total amount added to each batch, during its movement through the first zone, is that which is predetermined to be necessary to separate ink particles from the wastepaper and agglomerate and densify the ink particles;

rotating the drums of the second zone for predetermined, essentially equal intervals and, at the end of each interval, initiating the predetermined sequence of rotation so as to transfer the batch therein to a succeeding drum, and from a last drum out of the second zone so that the pulp fiber slurries which have been transferred into the first and succeeding drums of the second zone are washed therein and agglomerated and densified ink particles are permitted to pass through perforations in the drums of the second zone for drainage from the system while make-up water is added to said drums of the second zone; and recovering the cellulose fiber from the system as each batch is transferred from the last drum out of the second zone.

2. The method according to claim 1, wherein approximately 300% to 400% of the amount of the deinking/agglomerating composition introduced into each drum of the first zone during each interval is added to each drum of the first zone prior to the step of loading batches of wastepaper successively into the first drum.

3. The method according to claim 1, wherein the amount of deinking/agglomerating composition introduced into each drum of the first zone during each interval is approximately 2% to approximately 5% by weight basis of the total weight of fiber in the wastepaper.

4. The method according to claim 1, wherein a caustic is added to one or more drums in the first zone during one or more intervals.

5. The method according to claim 1, wherein a pH of approximately 11.0 is maintained in each of the drums in the first zone.

6. The method according to claim 1, wherein the temperature of the water is maintained at a temperature not greater than approximately 160° F. in each of the drums in the first zone.

7. The method according to claim 1, wherein a pH of approximately 11.0 is maintained in each of the drums in the second zone.

8. The method according to claim 1, wherein the temperature of the water is maintained at approximately between 120° F. and 140° F. in each of the drums in the second zone.

9. The method according to claim 1, wherein the cellulose fiber recovered from the system is passed through one or more centrifugal devices to remove contaminants from the cellulose fiber.

10. The method according to claim 1, wherein the cellulose fiber recovered from the system is passed through one or more pressure screens to remove contaminants from the cellulose fiber.

11. The method according to claim 1, wherein the drums of all zones are end to end and are rotated together.

12. A method for recovering cellulose fibers from printed wastepaper through the use of a continuous batch fiber recovery system having perforated drums rotatable within end-to-end compartments in which water is maintained at a level above the bottoms of the drums, and having a scoop of such construction as to transfer a batch from each drum to the next in response to a predetermined rotational sequence, comprising the steps of:

loading batches of the printed wastepaper successively into the first drum of a first zone of the system;

rotating the drums of the first zone for predetermined, essentially equal intervals and, at the end of each interval, initiating the predetermined sequence of rotation so as to transfer the batch therein to a succeeding drum, and from a last drum of the first zone to a first drum of a second zone;

introducing a deinking/agglomerating and densifying composition into each drum of the first zone during each interval, so that agitation due to rotation of the drum promotes separation of the ink particles from the wastepaper so as to form a pulp fiber slurry, and wherein the amount of deinking/agglomerating and densifying composition added to each batch during each interval is essentially equal and the total amount added to each batch, during its movement through the first zone, is that which is predetermined to be necessary to separate ink particles from the wastepaper and agglomerate and densify the ink particles;

rotating the drums of the second zone for predetermined, essentially equal intervals and, at the end of each interval, initiating the predetermined sequence of rotation so as to transfer the batch therein to a succeeding drum, and from a last drum of the second zone so that the pulp fiber slurries which have been transferred into the first and succeeding drums of the second zone are washed therein and agglomerated and densified ink particles are permitted to pass through perforations in the drums of the second zone for drainage from the system while make-up water is added to said drums of the second zone;

rotating the drums of a third zone having a first drum to receive a batch from the last drum of the second zone for predetermined, essentially equal intervals and, at the end of each interval, initiating the predetermined sequence of rotation so as to transfer the batch therein to a succeeding drum and out of the system from a last drum of the third zone, wherein the pulp fiber slurries and contaminants transferred into the first and succeeding drums of the third zone are permitted to pass through perforations in the drums of the third zone for drainage from the system while adding make-up water to said drums of the third zone;

and recovering the cellulose fiber that has passed through the perforations in the drums of the third zone.

13. The method according to claim 12, wherein approximately 300% to 400% of the amount of the deinking/agglomerating composition introduced into each drum of the first zone during each interval is added to each drum of the first zone prior to the step of loading batches of wastepaper successively into the first drum.

14. The method according to claim 12, wherein the amount of deinking/agglomerating composition introduced into each drum of the first zone during each interval is approximately 2% to approximately 5% by weight basis of the total weight of fiber in the wastepaper.

15. The method according to claim 12, wherein a caustic is added to one or more drums in the first zone during one or more intervals.

16. The method according to claim 12, wherein a pH of approximately 11.0 is maintained in each of the drums in the first zone.

17. The method according to claim 12, wherein the temperature of the water is maintained at a temperature not greater than approximately 160° F. in each of the drums in the first zone.

18. The method according to claim 12, wherein a pH of approximately 11.0 is maintained in each of the drums in the second zone.

19. The method according to claim 12, wherein the temperature of the water is maintained at approximately between 120° F. and 140° F. in each of the drums in the second zone.

20. The method according to claim 12, wherein the temperature of the water is maintained at approximately 100° F. in each of the drums in the third zone.

21. The method according to claim 12, wherein a pH of approximately 7.0 is maintained in each of the drums in the third zone.

22. The method according to claim 12, wherein the cellulose fiber recovered from the system is passed through one or more centrifugal devices to remove contaminants from the cellulose fiber.

23. The method according to claim 12, wherein the cellulose fiber recovered from the system is passed through one or more pressure screens to remove contaminants from the cellulose fiber.

24. The method according to claim 12, wherein the drums of all zones are end to end and are rotated together.

25. A method for recovering cellulose fibers from printed wastepaper through the use of a continuous batch fiber recovery system, comprising rotatable chambers having perforations to permit water to be circulated therethrough and of such construction as to transfer a batch of wastepaper from each chamber to the next in response to a predetermined rotational sequence, comprising the steps of:

loading batches of the printed wastepaper successively into the first chamber of a first zone of the system;

rotating the chambers of the first zone for predetermined, essentially equal intervals and, at the end of each interval, initiating the predetermined sequence of rotation so as to transfer the batch therein to a succeeding chamber, and from a last chamber in the first zone to a first chamber of a second zone;

introducing a deinking/agglomerating and densifying composition into each chamber of the first zone during each interval, so that agitation due to rotation of the chamber promotes separation of the ink particles from the wastepaper so as to form a pulp fiber slurry, and wherein the amount of deinking/agglomerating and densifying composition added to each batch during each interval is essentially equal and the total amount added to each batch, during its movement through the first zone, is that which is predetermined to be necessary to separate ink particles from the wastepaper and agglomerate and densify the ink particles;

rotating the chambers of the second zone for predetermined, essentially equal intervals and, at the end of each interval, initiating the predetermined sequence of rotation so as to transfer the batch therein to a succeeding chamber, and from a last drum out of the second zone so that the pulp fiber slurries which have been transferred into the first and succeeding chamber of the second zone are washed therein and agglomerated and densified ink particles are permitted to pass through perforations in the chambers of the second zone for drainage from the system while make-up water is added to said chambers of the second zone;

and recovering the cellulose fiber from the system as each batch is transferred out of the system from the last drum out of the second zone.

26. The method according to claim 25, wherein approximately 300% to 400% of the amount of the deinking/agglomerating composition introduced into each chamber of the first zone during each interval is added to each chamber of the first zone prior to the step of loading batches of wastepaper successively into the first chamber.

27. The method according to claim 25, wherein the amount of deinking/agglomerating composition introduced into each chamber of the first zone during each interval is approximately 2% to approximately 5% by weight basis of the total weight of fiber in the wastepaper.

28. The method according to claim 25, wherein a caustic is added to one or more chambers in the first zone during one or more intervals.

29. The method according to claim 25, wherein a pH of approximately 11.0 is maintained in each of the chambers in the first zone.

30. The method according to claim 25, wherein the temperature of the water is maintained at a temperature not greater than approximately 160° F. in each of the chambers in the first zone.

31. The method according to claim 25, wherein a pH of approximately 11.0 is maintained in each of the chambers in the second zone.

32. The method according to claim 25, wherein the temperature of the water is maintained at approximately between 120° F. and 140° F. in each of the chambers in the second zone.

33. The method according to claim 25, wherein the cellulose fiber recovered from the system is passed through one or more centrifugal devices to remove contaminants from the cellulose fiber.

34. The method according to claim 25, wherein the cellulose fiber recovered from the system is passed through one or more pressure screens to remove contaminants from the cellulose fiber.

35. The method according to claim 25, wherein the chambers of all zones are end to end and are rotated together.

* * * * *